United States Patent [19]
Yoro et al.

[11] Patent Number: 6,028,296
[45] Date of Patent: Feb. 22, 2000

[54] REGENERATIVE HEATER OF DIESEL ENGINE PARTICULATE TRAP AND DIESEL ENGINE PARTICULATE TRAP USING THE SAME HEATER

[75] Inventors: Katsuhiko Yoro; Tutomu Ooka; Masataka Oji, all of Hyogo, Japan

[73] Assignee: Sumitomo Electric Industries, Ltd., Osaka, Japan

[21] Appl. No.: 08/956,050

[22] Filed: Oct. 22, 1997

[30] Foreign Application Priority Data

Oct. 22, 1996 [JP] Japan .................................. 8-279080
Oct. 29, 1996 [JP] Japan .................................. 8-285746

[51] Int. Cl.[7] .............................. H05B 3/02; H01C 3/00
[52] U.S. Cl. ...................... 219/539; 219/532; 219/552; 338/208
[58] Field of Search .................................. 219/535, 538, 219/539, 552, 532; 60/320; 55/267, 307, 525; 338/217, 280, 283, 206, 208

[56] References Cited

U.S. PATENT DOCUMENTS

| | | | |
|---|---|---|---|
| 2,838,639 | 6/1958 | Planer | 338/62 |
| 4,662,911 | 5/1987 | Hirayama et al. | 55/282 |
| 5,014,511 | 5/1991 | Wade et al. | 60/303 |
| 5,409,669 | 4/1995 | Smith et al. | 422/174 |

FOREIGN PATENT DOCUMENTS

| | | | |
|---|---|---|---|
| 6-257422 | 9/1994 | Japan | F01N 3/02 |

Primary Examiner—Teresa Walberg
Assistant Examiner—Thor S. Campbell
Attorney, Agent, or Firm—Sughrue, Mion, Zinn, Macpeak & Seas, PLLC

[57] ABSTRACT

A meshed plate-like heater is disposed between multi-layer cylindrical filters without contacting with the filters to constitute a DPF. The heater has a form in which strip-like electric conduction paths are arranged and developed side by side horizontally, and then made cylindrical such that the different electric resistances are set for the inlet portion, the outlet portion and the center portion so as to constitute a DPF for regenerating particulates. The regenerative heater realizes a uniform temperature distribution all over the regenerative heater within a range of from about 600° C. which is the self-burning temperature of the particulates to 1,000° C. which is the heat-resistance temperature of the filters, in 10 minutes after the start of regeneration.

10 Claims, 12 Drawing Sheets

(AFTER 8 min.)

(AFTER 12 min.)

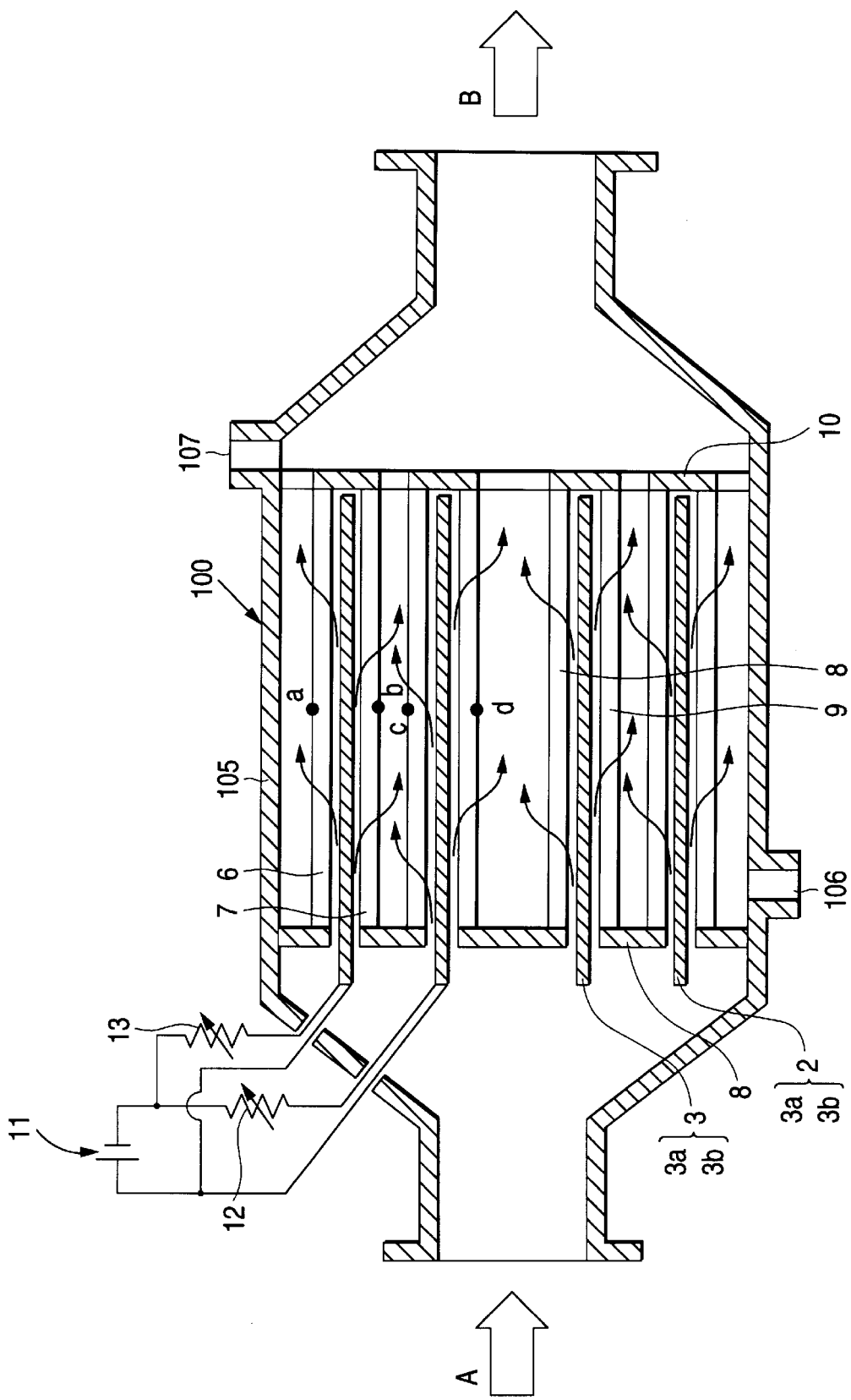

REGENERATIVE HEATER OF DIESEL ENGINE PARTICULATE TRAP AND DIESEL ENGINE PARTICULATE TRAP USING THE SAME HEATER

BACKGROUND OF THE INVENTION

The present invention relates to a regenerative heater for heating and burning fine particles (hereinafter abbreviated to "particulates") such as carbon or the like captured by a filter from exhaust gas of a Diesel engine, and also relates to a particulate trap for a Diesel engine (hereinafter abbreviated to "DPF") using such a regenerative heater.

Exhaust gas of a Diesel engine includes fine particles mainly consisting of carbon and called particulates. A DPF has been developed for removing these fine particles from the exhaust gas. The DPF is configured by the combination of a filter portion for capturing particulates and a regenerative heater for burning the captured particulates to thereby remove them.

Ceramic porous bodies or metal porous bodies are used for such capturing filters. Indeed the ceramic porous bodies have very minute voids so that they can capture particulates in exhaust gas surely, but since the voids are very minute, the loss of pressure of the exhaust gas is large and correspondingly a large capacity is required. Further, since the thermal conductivity of the ceramic porous bodies is poor, cracks, breaks, melting or the like are apt to be caused due to local heating. Particularly in regeneration, heat spots are apt to be caused by uneven heating hereby causing damaged to the filters. In the metal porous bodies, on the other hand, the void size can be controlled in comparison with the ceramic ones, and the thermal conductivity is superior, so that heat spots are hardly caused, and it is easy to keep the distribution of temperature uniform during regeneration.

As for the means for burning and removing particulates, there is a method to heat and burn particulates by conducting a current to an electric heater. Japanese Patent Unexamined Publication No. Hei-6-257422 proposes an arrangement in which different-diameter cylindrical filters are combined in multi-layers, and a plate-like regenerative heater is disposed among the filters in a position where the heater does not contact with the filters. FIG. 9 shows, as a conceptual diagram, the state where this means is incorporated in a DPF.

Exhaust gas of a Diesel engine flows into a casing 105 from a flange connected to an exhaust pipe in the direction of the left arrow A, and particulates are captured when the exhaust gas passes through the voids of cylindrical filters 102. A regenerative heater 103 is disposed between the cylindrical filters 102. An air inlet 106 for sucking oxygen in the atmosphere and an air outlet 107 may be provided for heating and burning the particulates efficiently. To supply oxygen more positively, there are also a method in which an air fan is provided, and a method in which oxygen in exhaust gas is used. The purified gas is released into the atmosphere in the direction of the left arrow B.

With such a configuration, efficient regeneration can be realized because the captured particulates are heated directly. However, on the side where exhaust gas flows into the filters, the air in the atmosphere which is at a low temperature may be mixed into the inside from the air inlet, while on the outlet side, the heat escapes as radiation heat through a shield holding the filters so that the temperature is difficult to reach a predetermined value. At the center portion, on the other hand, self-burning of the particulates takes part thereby increasing the temperature to an unnecessarily high degree.

In the case where a filter has a multi-layered structure, thermal capacity is different between an outer-cylinder side and an inner-cylinder side of the multi-layers. In addition, when the respective cylindrical electric heaters are viewed individually, the inside circular space surrounded by the electric heater has little flow of heat so that a constant temperature is kept, while the outside space has an active flow of heat to the outside of the DPF so as to be easily cooled. Therefore, in the filter constituted by a number of layers of cylinders, the central cylinder is apt to take a high temperature.

Uneven temperature distribution directly reduces the regenerative efficiency of the heater.

SUMMARY OF THE INVENTION

It is therefore an object of the present invention to provide a regenerative heater and/or a DPF in which uniform temperature distribution is realized all over the regenerative heater and/or the DPF in a range of from near 600° C. which is the burning temperature of particulates to 1,000° C. which is the heat-resistance temperature of filters.

To achieve the above-noted object, the present invention provides a regenerative heater and/or a DPF equipped with the regenerative heater that can generate different heat amounts in a longitudinal direction of the regenerative heater.

The present invention further provides a DPF equipped with a plurality of radially arranged regenerative heaters that can generate different heat amounts in a radial direction of the regenerative heaters.

In a preferred embodiment, as for a plate-like regenerative heater which is a main constituent of a DPF and which is inserted between multi-layer cylindrical filters for capturing particulates without contacting with the filters, the electric resistance of the center portion of the heater which is apt to be high temperature is made smallest in order to make the temperature distribution uniform over the whole length of the filters. Because the heat loss is large in the inlet portion and the outlet portion, the electric resistance of the heater is made comparatively larger at the inlet and outlet portions so as to set the heating value higher in order to compensate the heat loss. With such a structure, the heating value is proportional to the resistance because the current flowing in the heater is constant, and the electric resistance may be set desirably in accordance with expected temperature distribution.

As the means for setting the electric resistance in accordance with the expected temperature distribution, it is practical to alter the thickness of the heater or the geometric pattern of electric conduction path.

A DPF effective in regeneration to release purified gas into the atmosphere is realized in such a manner that a regenerative heater with such a form is disposed between cylindrical filters combined into multi-layers without contacting with the filters in a casing connected to an exhaust pipe of a Diesel engine to capture exhaust gas to thereby heat and burn the captured particulates.

Preferably, each of the cylindrical filters is formed of three-dimensional mesh-like porous member consisting of Ni as a main body and Cr and Al diffused in Ni, and preferably, the regenerative heater is formed of an electric conductor consisting of Fe—Cr as a main body with Al added thereto so that a heater can be obtained at a lower price and with higher workability than an inconel thin plate. As for the form of the heater, preferably, meshed strip-like plates are arranged and developed side by side horizontally, and then made cylindrical so that an electric conduction path is formed through the cylinder at the longest distance from the inlet to outlet of the cylinder. The respective electric resistances of the heater at the inlet portion, the center portion and the outlet portion are set desirably so as to make the temperature distribution uniform all over the filter.

In another preferred embodiment, thin plate-like electric heaters are provided among multi-layer cylindrical filters for capturing particulates without contacting with the filters, and the power supply to each of the heaters is reduced as the position of the heater is closer to the central one of the multi-layer cylindrical filters so that the temperature of the central cylinder, which is apt to be high, is reduced to thereby realize the balance with the outer temperature of the circumferential one of the cylinders.

As the means for reducing the power supply to each of the thin plate-like electric heaters, it is practical to alter the thickness of each heater or the geometric pattern of electric conduction paths so as to predetermine the resistance of the heaters.

As a method of reducing the power supply to each of the heaters, the quantity of electric conduction to each heater is selectively reduced as the position of the heater is closer to the central cylinder to control the temperature to thereby realize the balance of the temperature of the center-side cylinder with that of the outer circumferential cylinder.

Preferably, each of the cylindrical filters is formed of three-dimensional mesh-like porous member consisting of Ni as a main body and Cr and Al diffused in Ni, and preferably, each of the regenerative heaters is formed of an electric conductor consisting of Fe—Cr as a main body with Al added thereto so that a heater can be obtained at a lower price and with higher workability than an inconel thin plate. As for the form of the heater, preferably, meshed strip-like plates are arranged and developed side by side horizontally, and then made cylindrical so that an electric conduction path is formed through the cylinder at the longest distance from the inlet to outlet of the cylinder. Further, preferably, the respective electric resistances of the heater at the inlet portion, the center portion and the outlet portion are set desirably so as to make the temperature distribution uniform all over the filter.

BRIEF DESCRIPTION OF THE DRAWINGS

FIG. 15 is a sectional view of a DPF of the present invention.

DETAILED DESCRIPTION OF THE PREFERRED EMBODIMENTS

Preferred embodiments of the present invention will be described in detail with reference to the accompanying drawings.

First Embodiment

Figure 9:
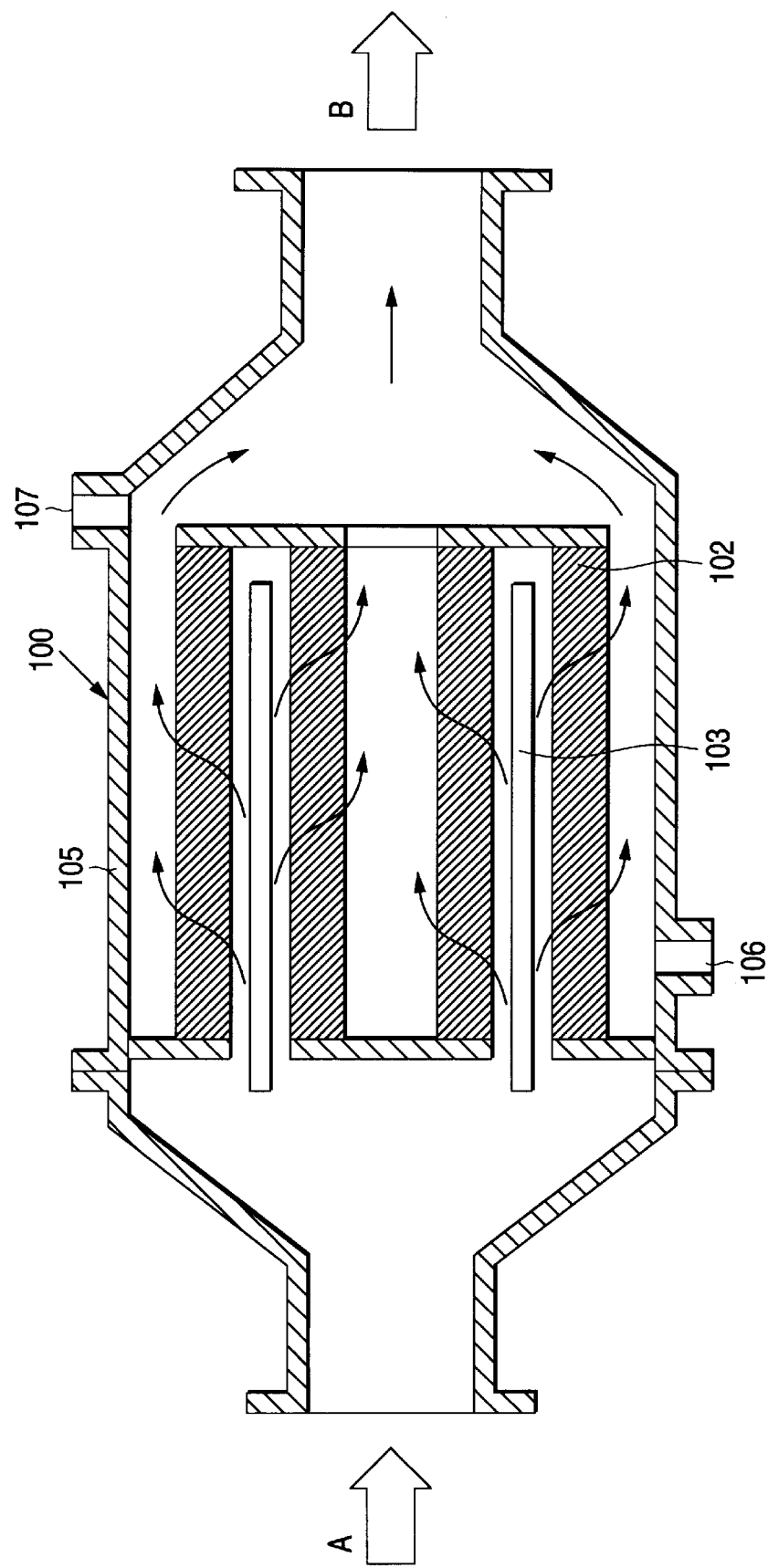
FIG. 9 is a conceptual diagram of a conventional DPF.

A heater according to a first embodiment of the present invention is a member corresponding to that depicted with a reference numeral 103 in FIG. 9 which is a conceptual diagram of a conventional DPF.

In particular, a heater is formed of meshed strip-like plates which are arranged and developed side by side horizontally, and then made cylindrical, and the electric resistance of the heater is set desirably from the inlet of the cylinder to the outlet. The heater is disposed between cylindrical filters 102 and stored in a casing 105 of a DPF.

When the filters are formed of metal porous bodies having an electric conductivity, the regenerative heater is provided so that the heater does not contact with the filters. Therefore, it is preferable that the heater to be inserted into a narrow gap between the filters is made of a thin plate, and it is convenient to form the pattern of the electric conductor by press-cutting or etching. The pattern of the electric conductor is not limited to mesh but may be various geometrical patterns, or may be constituted by rough mesh of punching metal or other electric conductors. Further, in order to put heating elements over the whole length of the cylinder in its longitudinal direction, preferably, strip-like electric conductors are arranged and developed side by side horizontally as shown in FIGS. 1 and 2, and an electric conduction path is formed through the cylinder at the longest distance.

Figure 1:
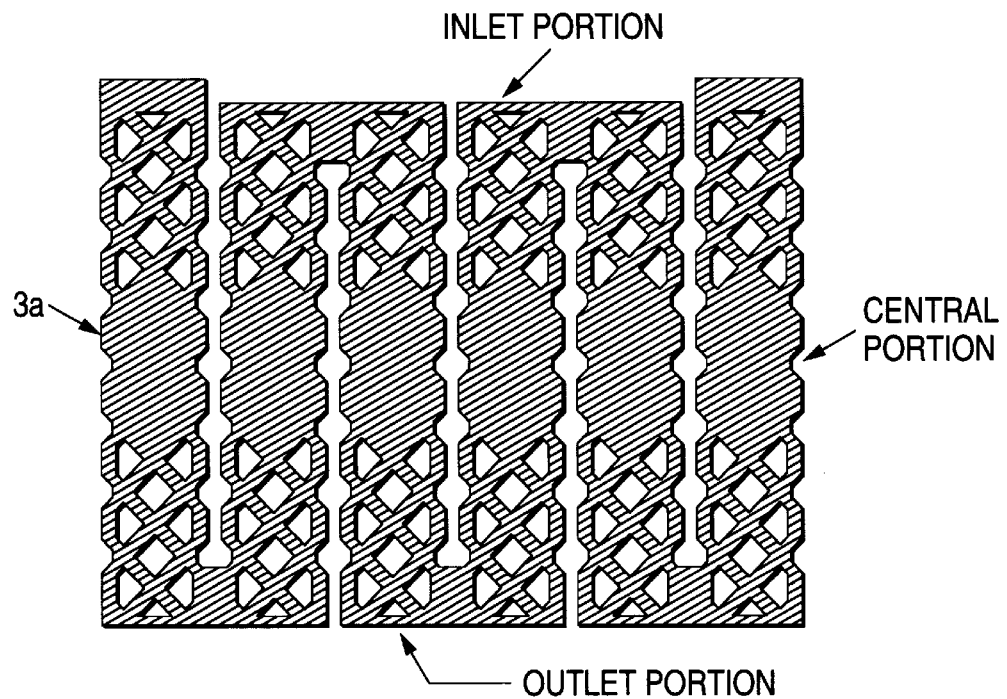
FIG. 1 shows a pattern of an electric conductor by which the electric resistance of the center portion of a heater is made smaller than that of the inlet portion or the outlet portion.

A heater 3a in FIG. 1 is formed by press-cutting a thin plate-like electric conductor consisting of Fe—Cr as a main body with Al added thereto. In this form, the electric resistance at the center portion is made smaller than that at the inlet or outlet, so that the heating value at the center portion is small.

Figure 2:
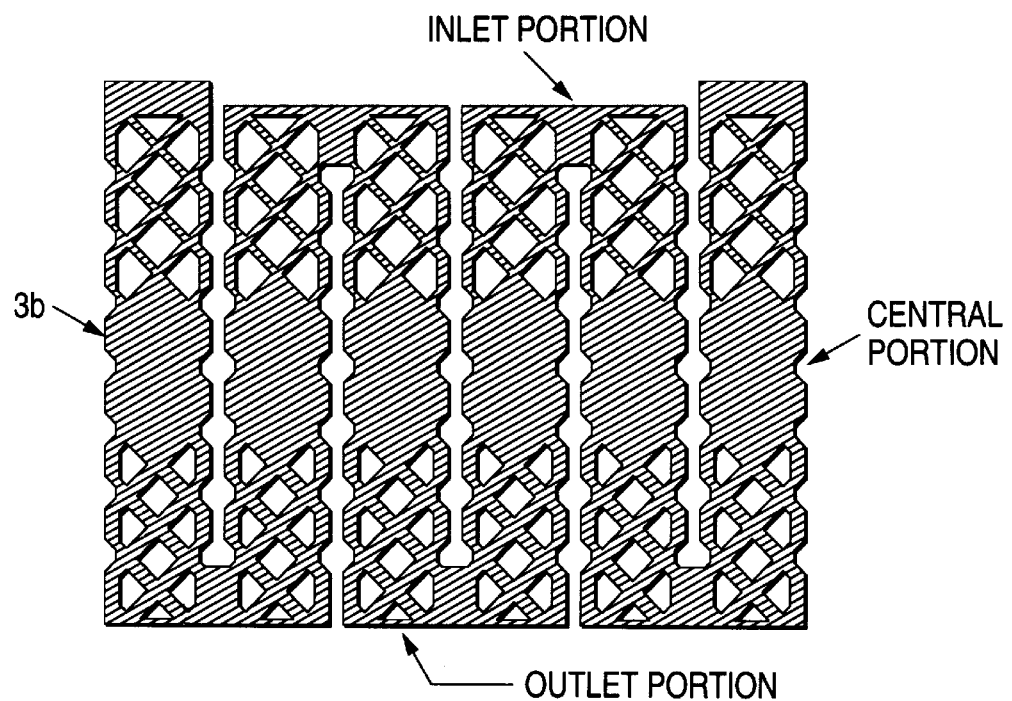
FIG. 2 shows a pattern of an electric conductor by which the electric resistance of a heater is made smaller step by step from the inlet portion to the outlet portion and further to the center portion.

A heater 3b in FIG. 2 is formed by pressing a similar thin plate into mesh. Since the electric resistance is made smaller in the order at the inlet portion, at the outlet portion, and at the center portion, the heating values at the respective portions are reduced correspondingly to the electric resistances.

Figure 3:
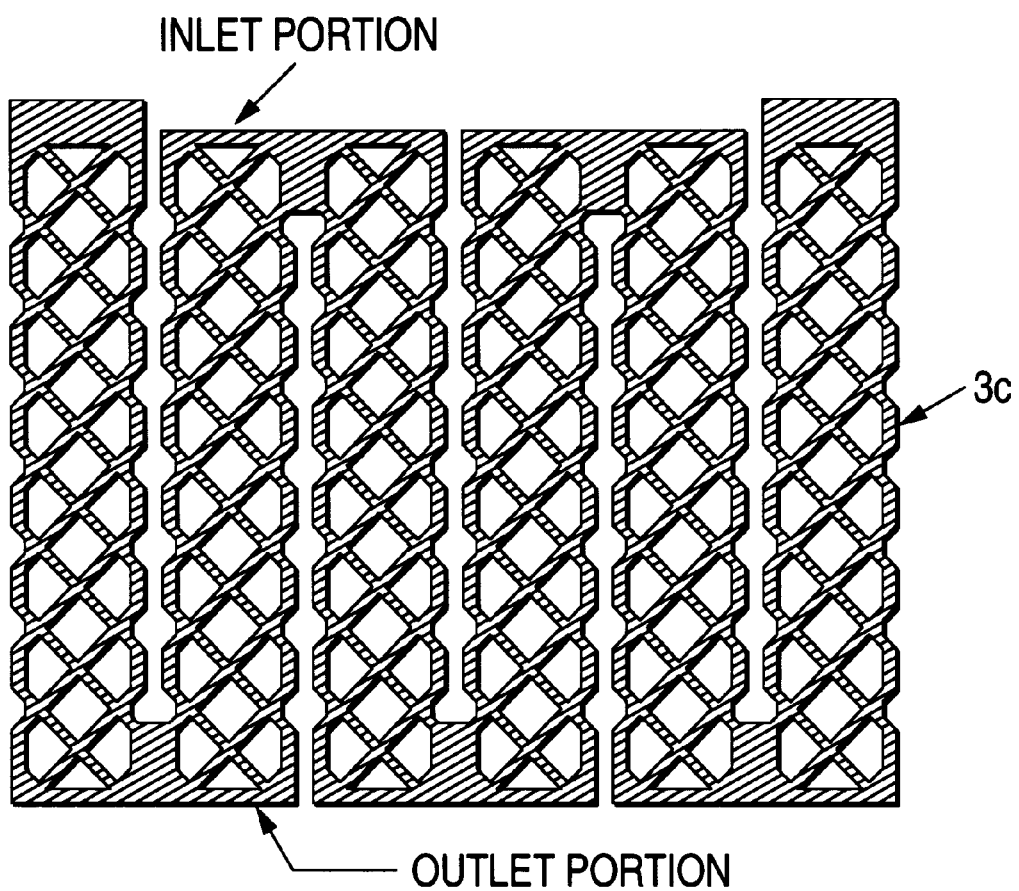
FIG. 3 shows a pattern of an electric conductor in which the electric resistance is made constant.

A heater 3c in FIG. 3 is the form of a comparative example for explaining the effects of the heater 3a and 3b of the present invention. This heater is formed by pressing a similar thin plate into mesh, but the electric resistance is uniform because a uniform pattern is formed in the plate of uniform thickness. Accordingly, the heating value per unit area is uniform.

EXAMPLE 1

Figure 4:
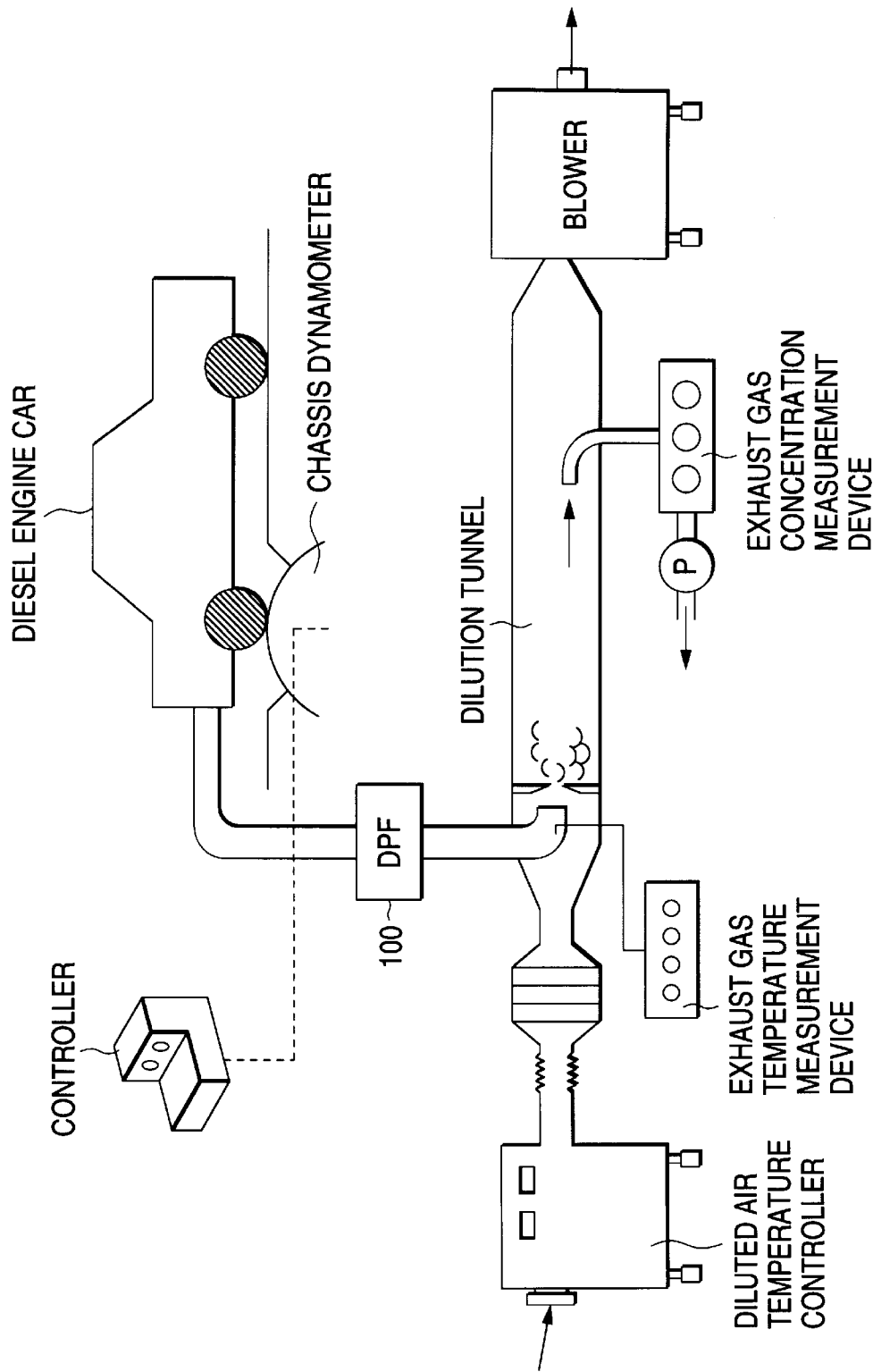
FIG. 4 shows a configuration diagram of a laboratory device of a DPF.
Figure 5:
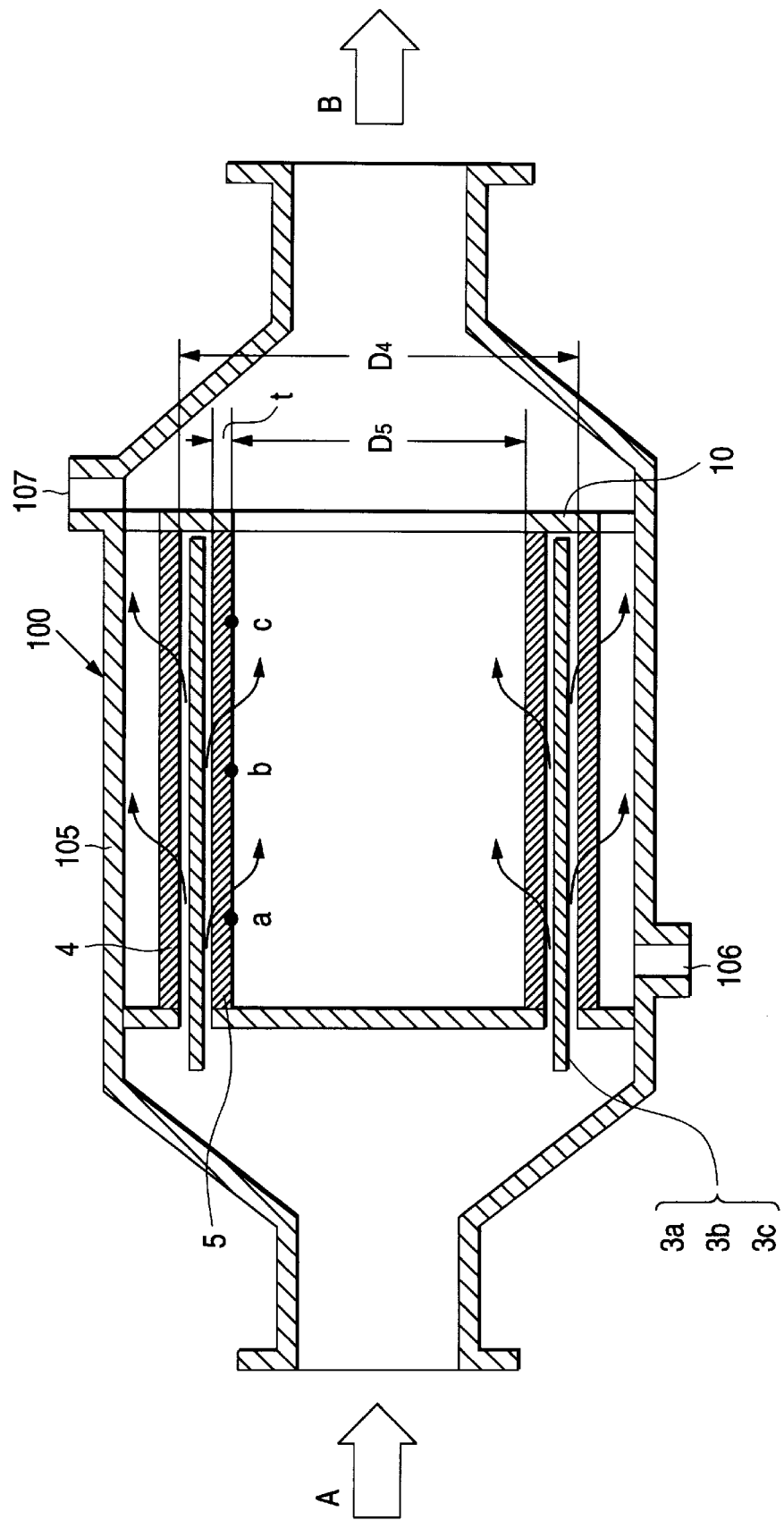
FIG. 5 is a sectional view of a DPF in Example 1 of the present invention.

A laboratory device shown in FIG. 4 is to evaluate the performance of a DPF. The device is configured so that a DPF 100 is disposed between a dilution tunnel and, the exhaust gas of a car which is disposed on a chassis dynamometer and mounted with a directly atomizing 4-cylinder Diesel engine of the piston displacement of 3,400 cc. Each of the heaters 3a, 3b and 3c was disposed between an outer cylinder 4 and an inner cylinder 5 of the filter shown in FIG. 5, and attached into the DPF 100. Thermo-couples (a, b and c) were attached at the illustrated positions, and the temperature distribution and the regeneration efficiency of particulates were measured. Preferably, the filters 4 and 5 are made of metal porous members with a three-dimensional mesh-like structure produced by the process disclosed in Japanese Patent Post-Examination No. Sho-57-39317, wherein the metal skeleton has a 5 to 100 μm thickness and communicating holes of the hole diameter of 150 to 400 μm, and consists of Ni as a main body, and Cr and Al diffused into Ni. The reference numeral 10 represents a doughnut-like shield, and such shields are disposed in the inlet and the outlet in order to control the flow of exhaust gas and hold the filters. Table 1 shows the size of the filters of Example 1.

TABLE 1

|  | inner diameter (φ) | thickness (t) (mm) | capture length (L) (mm) |
| --- | --- | --- | --- |
| outer cylinder | D4 = 96 | 6.86 | 220 |
| inner cylinder | D5 = 70 | 6.86 | 220 |

Table 2 shows the result of measurement in which the temperature rising of each of the three kinds of heaters of Example 1 was measured at the three points of the inlet (a), the center (b) and the outlet (c) and at the time 8 minutes after the start of regeneration in the laboratory device of FIG. 4, which was the temperature immediately before the burning of particulates, and at the time 12 minutes after the start of regeneration, which was the equilibrium temperature.

In addition, particulates were captured in the laboratory device of FIG. 4 until immediately before the pressure loss of the exhaust pressure of the engine exceeded 30 KPa, and the total weight (W1) of the weight of filter members and the weight of the captured particulates were measured. Table 2 shows the ratio of the total weight to the weight (W0) at the time 12 minutes after the start of regeneration which is regarded as the regeneration efficiency (W0/W1×100)

TABLE 2

| measured portion | inlet | | center | | outlet | | regeneration efficiency |
| --- | --- | --- | --- | --- | --- | --- | --- |
| elapsed time | 8 min. (° C.) | 12 min. (° C.) | 8 min. (° C.) | 12 min. (° C.) | 8 min. (° C.) | 12 min. (° C.) | 12 min. (%) |

TABLE 2-continued

| measured portion | inlet | | center | | outlet | | regeneration efficiency |
| --- | --- | --- | --- | --- | --- | --- | --- |
| form of filter | | | | | | | |
| 3a | 410 | 650 | 650 | 900 | 590 | 700 | 60 |
| 3b | 480 | 700 | 620 | 850 | 610 | 780 | 75 |
| 3c | 550 | 750 | 610 | 820 | 610 | 770 | 85 |

Figure 6:
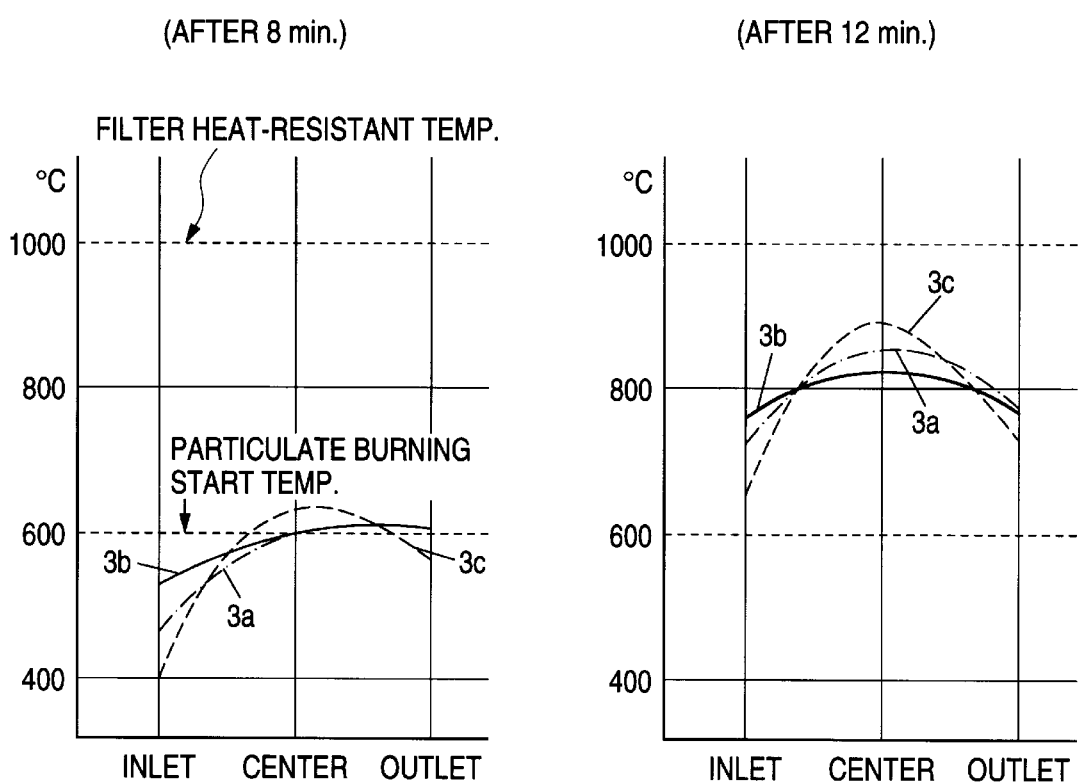
FIG. 6 is an experimental result showing the temperature distribution of filters in Example 1 of the present invention.

Further, the values in Table 2 are patterned over the whole capture length and shown in FIG. 6. It is apparent from Table 2 and FIG. 6 that the temperature of the filters at the time 12 minutes after the start of application of current when the equilibrium temperature is reached is such that the upper limit is lower than 1,000° C. which is the heat-resistance temperature of the filters and the lower limit has risen to be in a range of not lower than 600° C. which is the burning temperature of particulates. In addition, it is also understood that the form of the heater 3b provides the most stable temperature distribution.

EXAMPLE 2

Figure 7:
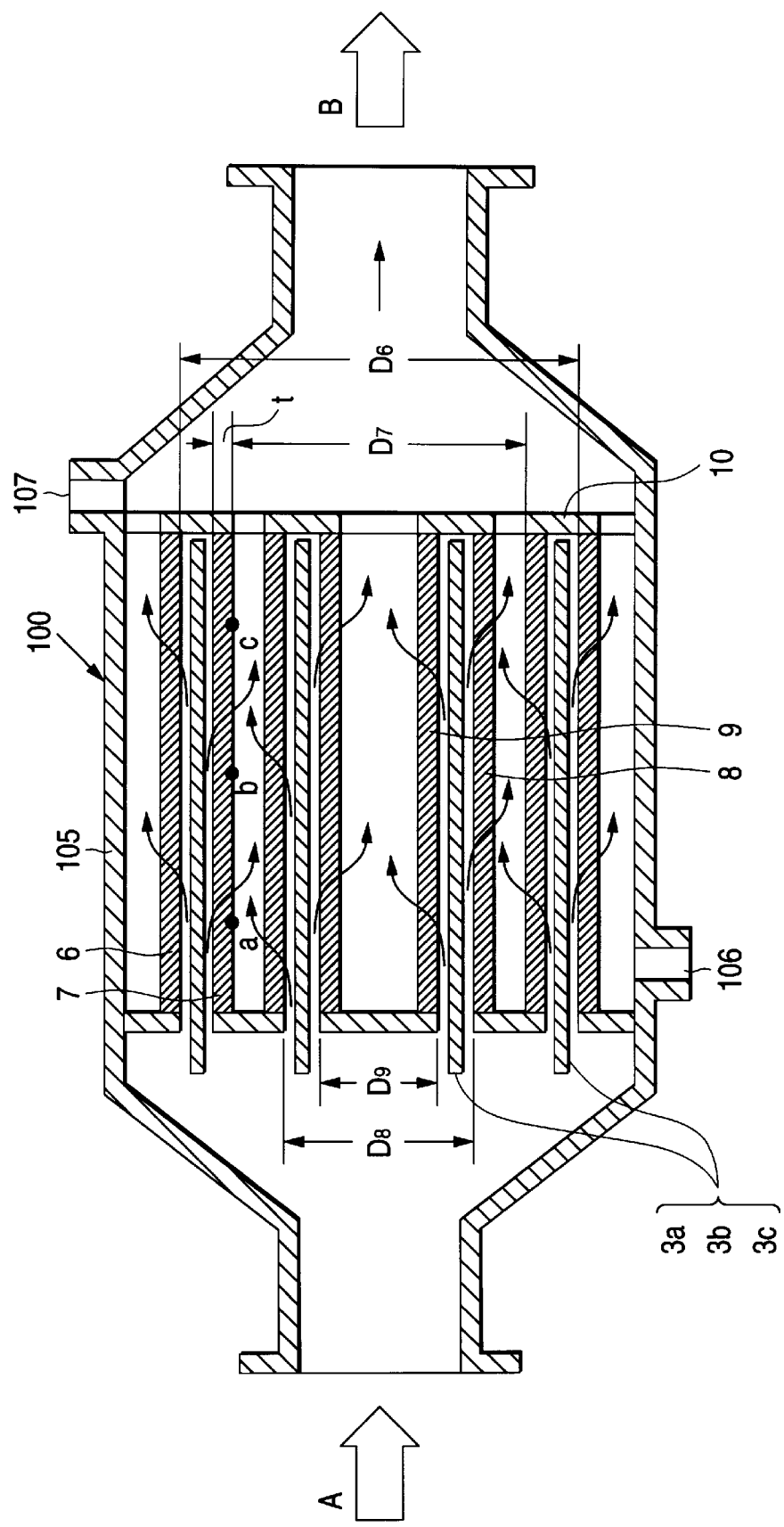
FIG. 7 is a sectional view of a DPF in Example 2 of the present invention.

Each of the above-mentioned heaters 3a, 3b and 3c was disposed on the inside of the outermost cylinder and on the outside of the innermost cylinder shown in FIG. 7, in the DPF 100 of the laboratory device shown in FIG. 4. Thermo-couples (a, b and c) were attached at the illustrated positions, and the temperature distribution and the regeneration efficiency of particulates were measured. Metal porous bodies similar to those in Example 1 were used for filters 6, 7, 8 and 9. Table 3 shows the size of the filters in Example 2.

TABLE 3

|  | inner diameter (φ) | thickness (t) (mm) | capture length (L) (mm) |
| --- | --- | --- | --- |
| cylinder 6 (outermost cylinder) | D6 = 96 | 6.86 | 220 |
| cylinder 7 | D7 = 70 | 6.86 | 220 |
| cylinder 8 | D8 = 50 | 6.86 | 220 |
| cylinder 9 (innermost cylinder | D9 = 25 | 6.86 | 220 |

Table 4 shows the regeneration ratio and the result of measurement in which the temperature rising of the three kinds of heaters of Example 2 were measured at the three points of the inlet (a), the center (b) and the outlet (c) and at the time 8 minutes after the start of regeneration in the laboratory device of FIG. 4, which was the temperature immediately before the burning of particulates, and at the time 12 minutes after the start of regeneration, which was the equilibrium temperature.

TABLE 4

| measured portion | inlet | | center | | outlet | | regeneration efficiency |
| --- | --- | --- | --- | --- | --- | --- | --- |
| elapsed time | 8 min. (° C.) | 12 min. (° C.) | 8 min. (° C.) | 12 min. (° C.) | 8 min. (° C.) | 12 min. (° C.) | 12 min. (%) |

TABLE 4-continued

| measured portion | inlet | | center | | outlet | | regeneration efficiency |
|---|---|---|---|---|---|---|---|
| form of filter | | | | | | | |
| 3a | 400 | 640 | 640 | 890 | 600 | 690 | 55 |
| 3b | 490 | 710 | 610 | 850 | 600 | 790 | 73 |
| 3c | 540 | 750 | 600 | 820 | 610 | 760 | 84 |

Figure 8:
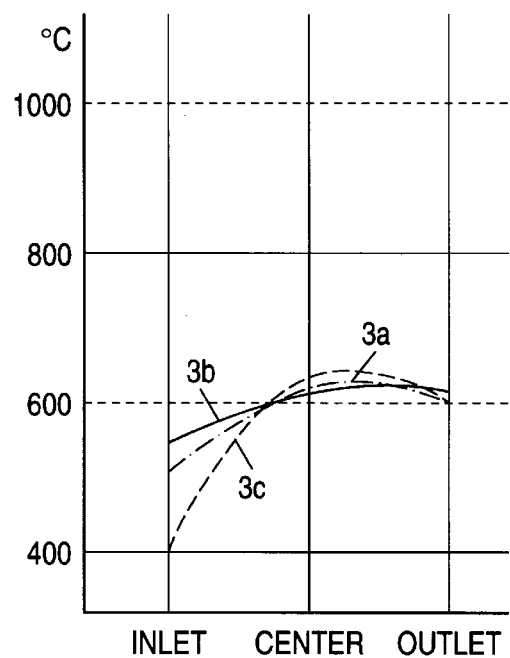
FIG. 8 is an experimental result showing the temperature distribution of filters in Example 2 of the present invention.
Figure 8:
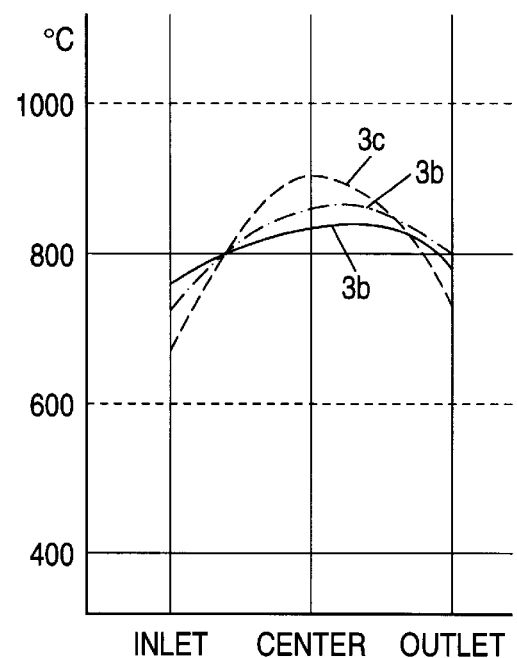

Further, the values in Table 4 are patterned over the whole capture length and shown in FIG. 8. It is apparent from Table 4 and FIG. 8 that the temperature of the filters at the time 12 minutes after the start of application of current when the equilibrium temperature is reached is such that the upper limit is lower than 1,000° C. which is the heat-resistance temperature of the filters and the lower limit has risen to be in a range of not lower than 600° C. which is the burning temperature of particulates. In addition, it is also understood that the form of the heater 3b provides the most stable temperature distribution in the same manner as in Example 1.

Since the outermost cylinder of the filter in Example 2 is made to be equal in diameter to that in the Example 1, the former occupies as a DPF the same space as that of the latter. However, the elapsed time until the capture of particulates becomes near a saturated state and the pressure loss of the exhaust pressure of the engine reaches 30 KPa is longer in Example 2. While the total weight of the filter members in Example 1 is 1.0 kg, the total weight of the filter members in Example 2 is 1.6 kg. On the assumption that the weight of captured particulates is simply proportional to the number of holes of the three-dimensional meshed structure, the effective capture time in Example 2 is 1.6 times as long as that in Example 1.

If the diameter of the outermost cylinder in Example 1 is extended to the volume corresponding to the number of holes in Example 2, the effective capture time can be prolonged. However, in the consideration of limitation in the space of attachment, Example 2 may be more effective.

In addition, in practice, there are a method in which two DPFs are disposed per engine so that one DPF performs regeneration while the other DPF is capturing particulates, and a method in which particulates are captured during running of the engine while regeneration is performed during stoppage of the engine.

According to the first embodiment of the present invention, the electric resistance of respective portions of a heater inserted between multi-layer cylindrical filters for capturing particulates can be set desirably. Accordingly, it is possible to keep the temperature distribution almost uniform over the whole capture length of the filters, and it is possible to maintain the equilibrium temperature while the particulates are heated and regenerated by the heater, in a range of from 600° C. which is the temperature for the particulate to start burning to 1,000° C. which is the heat-resistance temperature of the filters. Accordingly, it is possible to provide a DPF superior in the regeneration efficiency and having durability.

Second Embodiment

A heater according to the present invention is a member corresponding to that depicted with a reference numeral 103 in FIG. 9 which is a conceptual diagram of a conventional DPF.

When filters consist of metal porous bodies having an electric conductivity, the heater is provided without contacting with the filters. Therefore, the heater to be inserted into a narrow gap is preferably a thin plate, and it is convenient to form the pattern of an electric conductor by press-cutting or etching. The electric conductor may have various geometrical patterns, or may be constituted by a punching metal or a rough net of an electric conductor.

As the material of the heater, it is convenient to use that which consists of Ni—Cr as a main body, with Al as an additive, or that which consists of Fe—Cr as a main body which has a larger resistance than Fe—Cr, with Al as an additive.

As the material of the filters, it is preferable to use a metal porous member which has a three-dimensional mesh-like structure made by the manufacturing method disclosed in Japanese Patent Post-Examination No. Sho-57-39317. In the metal porous body, the metal skeleton thickness is 5 to 100 μm, and the size of the communicating holes is 150 to 400 μm, and the metal porous body consists of Ni with Cr and Al diffused into Ni.

In order to keep the temperature in a casing 105 of the DPF uniform, the thickness of each heater is more increased to more reduce its resistance value, or the material of the heater is combined with a material with a higher electric conductivity to more reduce its resistance value, to thereby limit the heating value as the position of the heater is closer to the central cylinder of the filters. Alternatively, when the heaters have the same specification, it will do to control the power supply to each heater so as to more reduce the power supply as the position of the heater is closer to the central cylinder.

Figure 10:
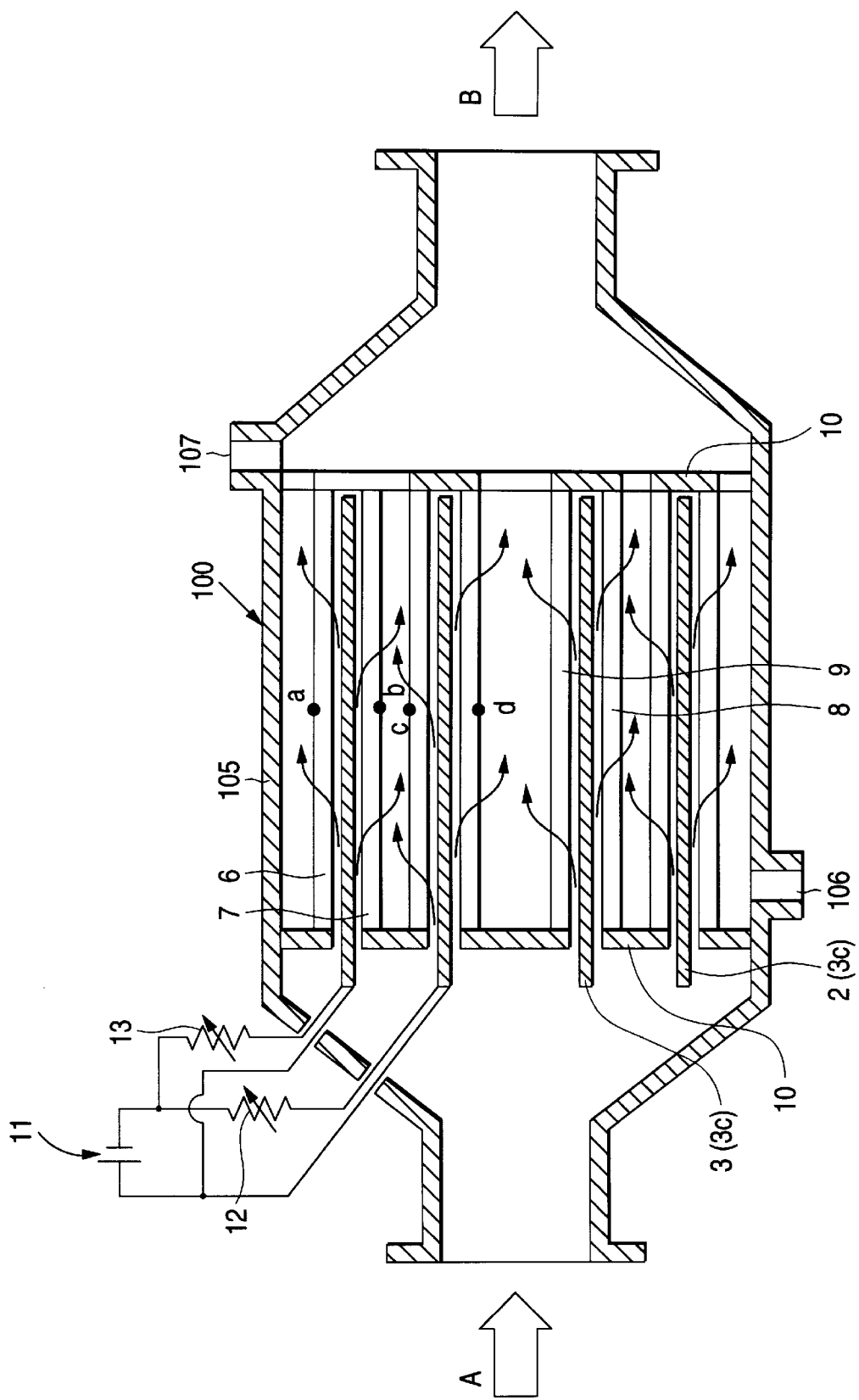
FIG. 10 is a sectional view of a DPF according to the present invention.

A specific configuration diagram is shown in FIG. 10. Exhaust gas of a Diesel engine flows into the casing 105 in the direction of the left arrow A from a flange connected to an exhaust pipe, and particulates are captured when the exhaust gas passes through voids of cylindrical filters 6, 7, 8 and 9. Regenerative heaters 2 and 3 are disposed between the cylindrical filters 6 and 7 and between the cylindrical filters 8 and 9 respectively. Thermo-couples a, b, c and d are provided on the outer circumference of the filter 6, on the inner circumference of the filter 7, on the outer circumference of the filter 8 and on the inner circumference of the filter 9 at intermediate points of the capturing length of the filters respectively so as to detect changes in temperature of the respective filters. The reference numerals 10 and 10' represent shields for controlling the flow of the exhaust gas. Electric power is distributed to the regenerative heaters 2 and 3 from a power source 11 through variable resistors 12 and 13. An air inlet 106 for sucking oxygen in the atmosphere and an air outlet 107 may be provided in order to heat and burn the particulates efficiently.

A laboratory device shown in FIG. 4 is for evaluating the performance of a DPF, and has a configuration in which a DPF 100 is disposed between a dilution tunnel and the exhaust gas of a car disposed on a chassis dynamometer and mounted with a directly atomizing 4-cylinder Diesel engine of the piston displacement of 3,400 cc. Specifications of regenerative heaters constituting this DPF 100 as shown in FIG. 10 were prepared as shown in Table.

TABLE 5

| | heater position | material | heater thickness (mm) | elec. power (W) | electric resistance (Ω) |
|---|---|---|---|---|---|
| Comp. | 2 | Ni—Cr—Al | 0.2 | 500 | 0.5 |
| Examp. | 3 | Ni—Cr—Al | 0.2 | 500 | 0.5 |

TABLE 5-continued

| heater position | material | heater thickness (mm) | elec. power (W) | electric resistance (Ω) |
|---|---|---|---|---|
| 1 Comp. Examp. 2 | 2 none | Ni—Cr—Al — | 0.2 — | 700 — | 0.5 — |
| Examp. 3 | 2 3 | Ni—Cr—Al Ni—Cr—Al | 0.12 0.28 | 300 700 | 0.83 0.36 |
| Examp. 4 | 2 3 | Fe—Cr—Al Ni—Cr—Al | 0.2 0.2 | 300 700 | 0.83 0.36 |

In the heater units used in Table 5, an electric conduction path of a predetermined geometrical pattern was formed in a plate of uniform thickness, and a voltage of the same conditions was applied to all the heaters.

Comparative Example 1

Figure 11:
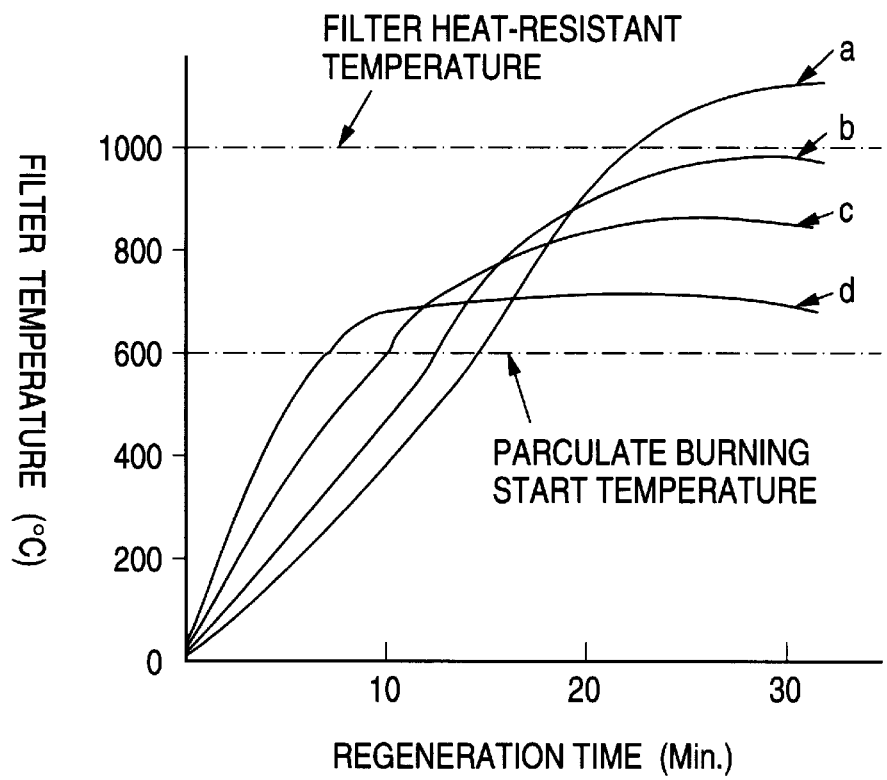
FIG. 11 is a view showing the changes in temperature of heaters during regeneration according to Comparative Example 1 for explaining the effects of the present invention.

The materials and thickness of the heaters 2 and 3 of the DPF shown in FIG. 10 were unified into Ni—Cr—Al and 0.2 mm respectively, and the electric power of 500 W was supplied to each of the heaters 2 and 3. FIG. 11 shows the changes in temperature of the thermo-couples a, b, c and d as the time passes up to the stoppage of the power supply from the end of regeneration about 25 minutes after the start of burning of particulates after the start of regeneration.

It can be found that the temperature of thermo-couple rises more rapidly to reach 600° C. which is the self-burning temperature of the particulates, as the position of the thermo-couple is closer to the innermost circumference like the central thermo-couple d, and then the temperature of the thermo-couple rises more rapidly into a range above 1,000° C. which is the oxidization temperature of the filters, as the position of the thermo-couple is closer to the outermost filter like the thermo-couple d after the temperature of all the thermo-couples rises discontinuously after the temperature has exceeded 600° C. which is the self-burning temperature of the particulates. That is, it was confirmed that the filters are exposed to higher temperature as the position of the filter is closer to the center, like the center filter 9.

Comparative Example 2

Figure 12:
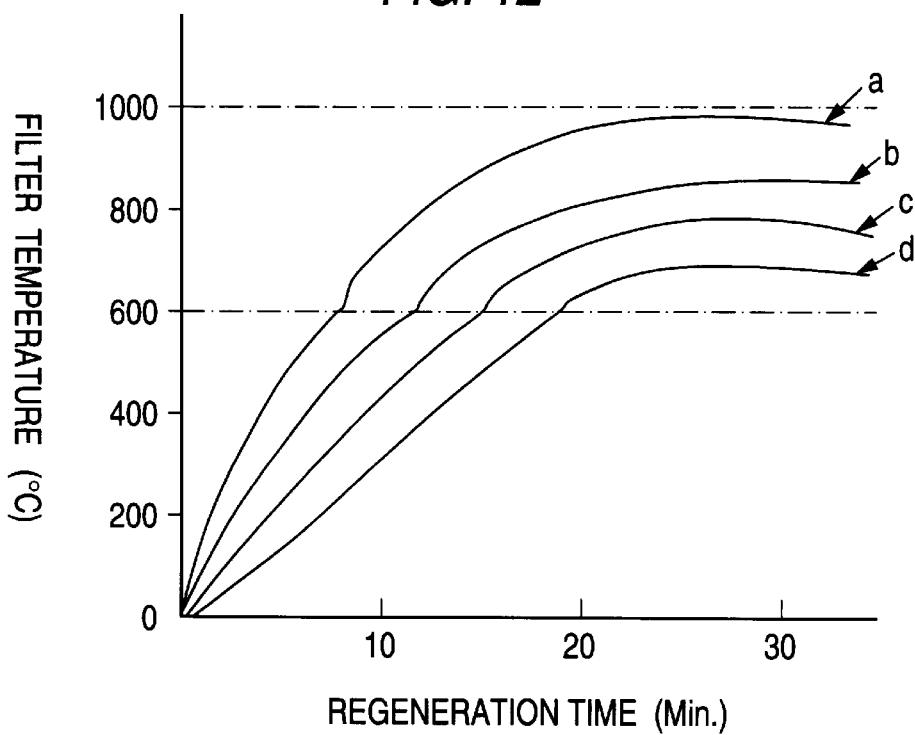
FIG. 12 is a view showing the time changes in temperature of heaters during regeneration according to Comparative Example 2 for explaining the effects of the present invention.

Electric power of 1,000 W was supplied to the heater 2 of the DPF shown in FIG. 10, and an electric current was not applied to the heater 3. FIG. 12 shows the changes in temperature of the thermo-couples a, b, c and d as the time passes up to the stoppage of the power supply from the end of regeneration about 25 minutes after the start of burning of particulates after the start of regeneration.

As for the temperature rising, on the contrary to Comparative Example 1, it is understood that the temperature of the thermo-couple d which is in the farthest position from the heater 2 rises more slowly, and even the temperature of the outermost thermo-couple a reaching the highest temperature does not exceed 1,000° C. which is the oxidization temperature of the filters after the temperature of all the thermo-couples rises discontinuously after the temperature of the thermo-couple d exceeds 600° C. which is the self-burning temperature of particulates. This phenomenon suggests that the balance of temperature in the casing 105 can be realized by controlling the temperature of the heater of the central cylinder. However, the variation of temperature among the thermo-couples are so large that burning is not performed efficiently.

EXAMPLE 3

Figure 13:
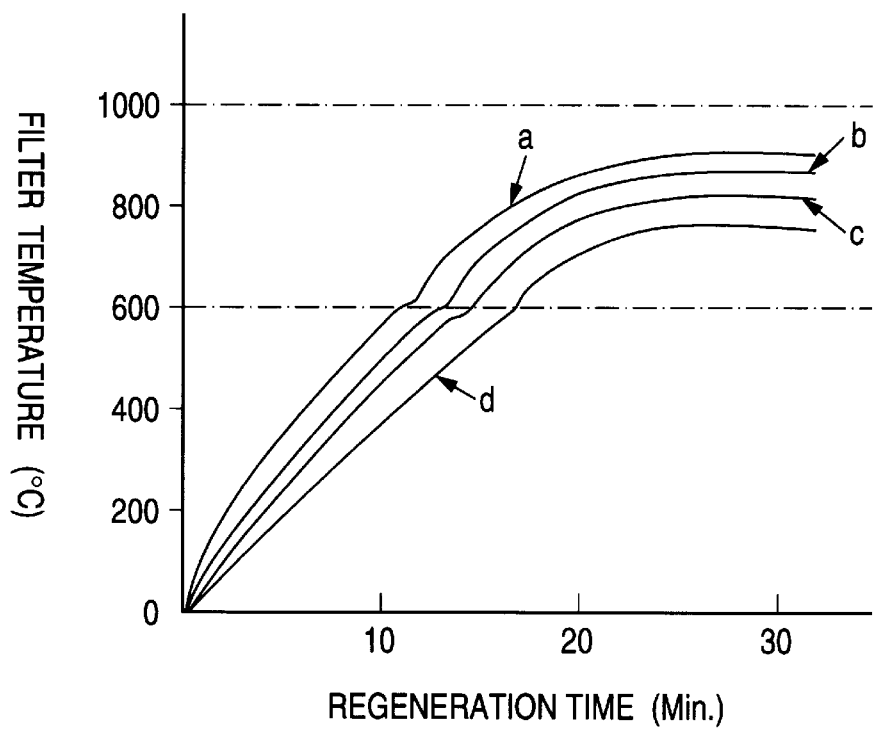
FIG. 13 is a view showing the time-changes in temperature of heaters during regeneration according to Example 3 of the present invention.

Except that the material of the heaters 2 and 3 of the DPF shown in FIG. 10 was unified into Ni—Cr—Al, the thicknesses of the heaters 2 and 3 were made 0.12 mm and 0.28 mm respectively so that their resistance values were changed into 0.83Ω and 0.36Ω respectively, and the electric powers of 300 W and 700 W were supplied to the heaters 2 and 3, respectively. FIG. 13 shows the changes in temperature of the thermo-couples a, b, c and d as the time passes up to the stoppage of the power supply from the end of regeneration about 25 minutes after the start of burning of particulates after the start of regeneration.

The temperature of the thermo-couples more quickly rises to 600° C. which is the self-burning temperature of the particulates, as the position of the thermo-couple is closer to the outermost circumference like the thermo-couple a, while the scattering of the temperature among the thermo-couples is less in comparison with the Comparative Examples 1 and 2, so that the temperature of all the thermo-couples converges near 800° C. even after the temperature rises discontinuously after it exceeds 600° C. which is the self-burning temperature of the particulates.

EXAMPLE 4

Figure 14:
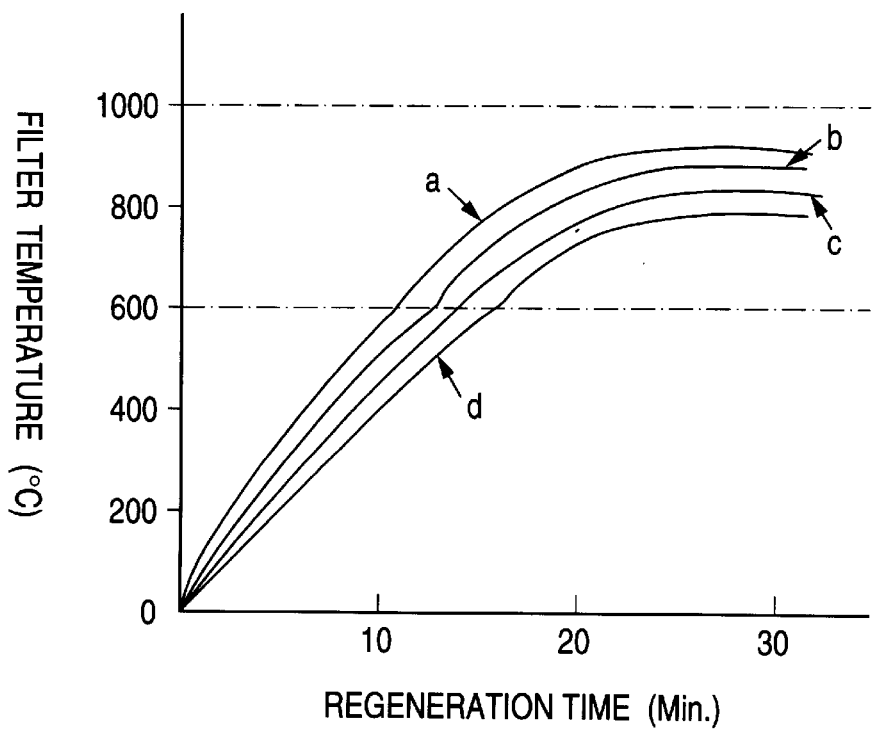
FIG. 14 is a view showing the time changes in temperature of heaters during regeneration according to Example 4 of the present invention.

Except that the thicknesses of the heaters 2 and 3 of the DPF shown in FIG. 10 were made equal to each other, the materials thereof were set to be Fe—Cr—Al and Ni—Cr—Al respectively so that the resistance values were changed into 0.83Ω and 0.36Ω respectively, and the electric powers of 300 W and 700 W were supplied to the heaters 2 and 3, respectively. FIG. 14 shows the changes in temperature of the thermo-couples a, b, c and d as the time passes up to the stoppage of the power supply from the end of regeneration about 25 minutes after the start of burning of particulates after the start of regeneration.

The temperature rising is almost the same as that in Example 3. The temperature of the thermo-couples more quickly rises to 600° C. which is the self-burning temperature of the particulates, as the position of the thermo-couple is closer to the outermost circumference like the thermo-couple a, while the scattering of the temperature among the thermo-couples is less in comparison with the Comparative Examples 1 and 2, so that the temperature of all the thermo-couples converges near 800° C. even after the temperature rises discontinuously after it exceeds 600° C. which is the self-burning temperature of the particulates.

According to the second embodiment of the present invention, regenerative heaters are disposed among multi-layer cylindrical filters for capturing particulates in positions without contacting these filters. The heating quantity is controlled by increasing the thickness of the heater to thereby reduce its resistance value as the position of the heater is closer to the central cylinder of the filters, or by combining with another material having a superior electric conductivity to reduce its resistance value, or by reducing the power supply to the heater as the position of the heater is closer to the central cylinder, etc. Accordingly, as for the temperature distribution inside a casing of a DPF, the temperature of any filter can be converged into a range of from 600° C. which is the self-burning temperature of the particulates to 1,000° C. which is the heat-resistance temperature of the filters, 10 to 25 minutes after the start of regeneration. It is therefore possible to provide a durable DPF superior in the efficiency of regeneration.

In addition, the first and second embodiments may be combined together. For instance, as shown in FIG. 15, the heaters 3a or 3b used in the first embodiment may be incorporated into the DPF of the second embodiment so that the heat distribution can be controlled in both longitudinal and radial directions.

What is claimed is:

1. A plate-like regenerative heater adapted to be inserted between multi-layer cylindrical filters without contacting with said filters, said multi-layer cylindrical filters constituting a Diesel engine particulate trap for capturing particulates, wherein electric resistances of at least three respective portions of said heater are set differently from one another such that a first portion includes a higher resistance than a second portion, and said second portion includes a higher resistance than a third portion.

2. A plate-like regenerative heater according to claim 1, wherein an electric resistance of each longitudinal end portion of said heater is set greater than an electric resistance of a longitudinal central portion of said heater.

3. A plate-like regenerative heater according to claim 1, wherein a pattern formed on each longitudinal end portion of said heater is different from a pattern formed on a longitudinal central portion of said heater.

4. A Diesel engine particulate trap for capturing particulates, said trap comprising:

at least two cylindrical filters arranged in a radial direction; and at least one regenerative heater inserted between said cylindrical filters without contacting with said filters, wherein electric resistances of at least three respective portions of said heater are set different from one another such that a first portion includes a higher resistance than a second portion, and said second portion includes a higher resistance than a third portion.

5. A Diesel engine particulate trap according to claim 4, wherein each of said filters is formed of a three-dimensional mesh-like porous member essentially consisting of Ni as a main body and Cr and Al diffused into Ni, and said regenerative heater is formed of an electric conductor essentially consisting of Fe—Cr as a main body with Al added thereto.

6. A Diesel engine particulate trap, including a filter and a regenerative heater, farther comprising:

means for distributing a variable amount of power to the regenerative heater, for heating and burning particulates captured by the filter to thereby purify gas; and means for releasing said gas thus purified into an atmosphere.

7. A plate-like regenerative heater according to claim 1, wherein said third portion is located between said first portion and said second portion.

8. A Diesel engine particulate trap according to claim 4, wherein said third portion is located between said first portion and said second portion.

9. A Diesel engine particulate trap according to claim 4, further comprising a third cylindrical filter arranged concentrically with said at least two cylindrical filters, and a second regenerative heater inserted between said at least two cylindrical filters and said third cylindrical filter.

10. A Diesel engine particulate trap according to claim 9, wherein said third cylindrical filter is arranged outward of said at least two cylindrical filters, and said second regenerative heater produces more heat than said at least one regenerative heater.

* * * * *